United States Patent
Yanagida

(10) Patent No.: US 7,492,409 B2
(45) Date of Patent: Feb. 17, 2009

(54) LIGHT CONTROLLER AND IMAGING APPARATUS

(75) Inventor: Toshiharu Yanagida, Tokyo (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 10/514,080

(22) PCT Filed: May 8, 2003

(86) PCT No.: PCT/JP03/05762

§ 371 (c)(1),
(2), (4) Date: Nov. 10, 2004

(87) PCT Pub. No.: WO03/096108

PCT Pub. Date: Nov. 20, 2003

(65) Prior Publication Data

US 2005/0157247 A1   Jul. 21, 2005

(30) Foreign Application Priority Data

May 10, 2002   (JP) .............................. 2002-135164

(51) Int. Cl.
*H04N 5/225* (2006.01)
(52) U.S. Cl. ..................................... 348/335; 348/360
(58) Field of Classification Search ................. 348/335, 348/336, 339, 342, 360; 359/485, 490–492, 359/494, 497
See application file for complete search history.

(56) References Cited

U.S. PATENT DOCUMENTS

| 4,291,949 A | 9/1981 | Wada et al. |
| 7,123,412 B2 * | 10/2006 | Saitoh et al. ................ 359/494 |

FOREIGN PATENT DOCUMENTS

| EP | 1099976 | 5/2001 |
| EP | 1186941 | 3/2002 |
| JP | 05-323306 | 12/1993 |
| JP | 5-323306 | 12/1993 |
| JP | 08-086980 | 4/1996 |
| JP | 2000-56268 | 2/2000 |
| JP | 2001142047 A * | 5/2001 |
| JP | 2002-122613 | 4/2002 |

* cited by examiner

*Primary Examiner*—Tuan V Ho
(74) *Attorney, Agent, or Firm*—Rockey, Depke & Lyons, LLC

(57) ABSTRACT

An imaging apparatus is comprised of a light controller including a liquid crystal element and a polarizing plate located in front of an optical low-pass filter in the optical path of the imaging apparatus. The polarization direction of the polarizing plate and the orientation for the liquid crystal element are selectively chosen with respect to the rotation of the optical low pass filter elements in order to achieve a desired improvement in the device performance.

14 Claims, 12 Drawing Sheets

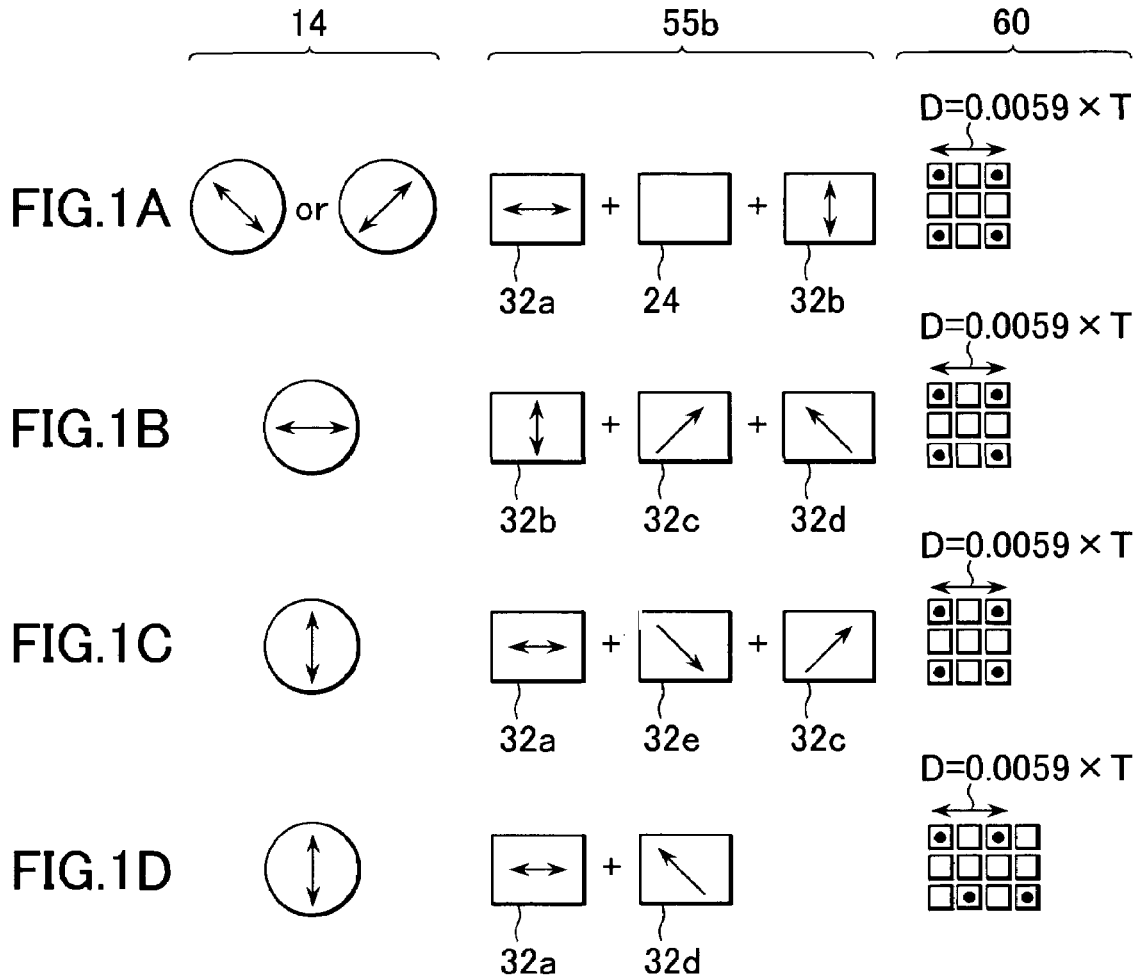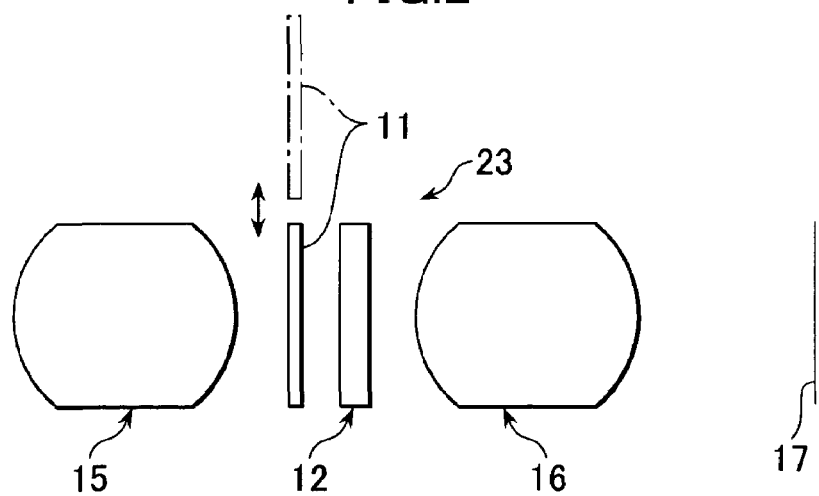

FIG.3
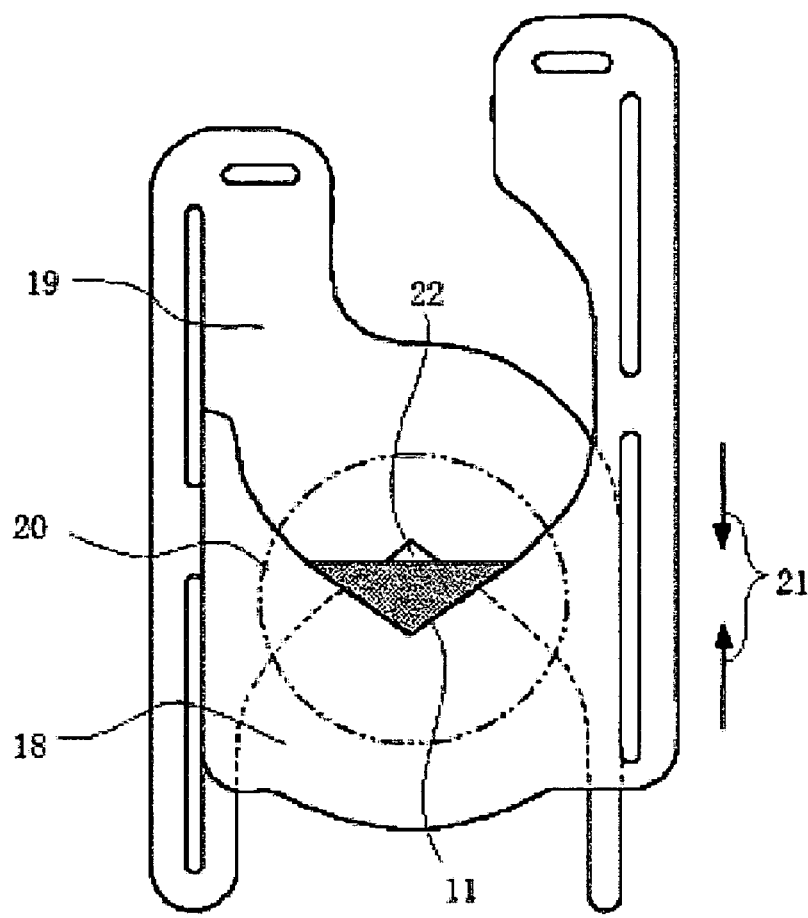
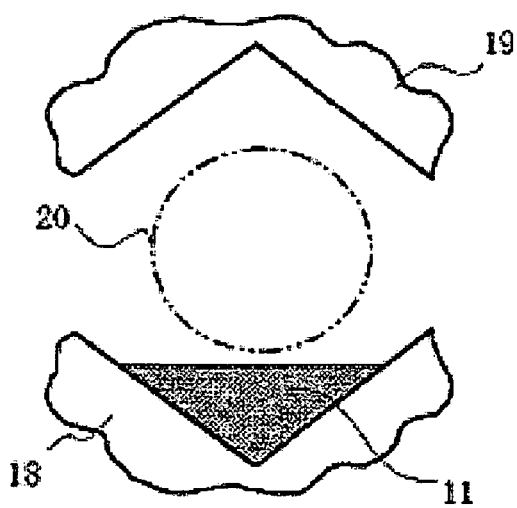
FIG.4A
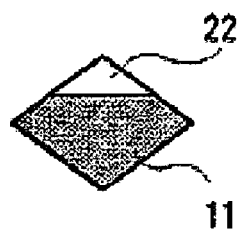
FIG.4B
FIG.4C

NO VOLTAGE IS APPLIED → TRANSMITTED

VOLTAGE IS APPLIED → NON-TRANSMITTED

DRIVE WAVEFORM OF RECTANGULAR WAVE USED AS DRIVE WAVE

OPTICAL AXIS

OPTICAL AXIS 45°

INCIDENT LIGHT(1)

OUTPUT LIGHT(2)

LIGHT CONTROLLER AND IMAGING APPARATUS

This application claims priority to Japanese Patent Application No. JP2002-135164, filed May 10, 2002 which is incorporated herein by reference.

TECHNICAL FIELD

The present invention relates to a light control device, for example, for controlling a quantity of incident light and for outputting the light, and to an imaging device using this light control device.

BACKGROUND ART

Generally, a polarizing plate is used in a light control device using a liquid crystal cell. As this liquid crystal cell, for instance, a TN (Twisted Nematic) liquid crystal cell or a Guest Host (GH) liquid crystal cell is used.

FIGS. 12A and 12B are schematic drawings each showing the principle of an operation of a conventional light control device. This light control device is constituted mainly by a polarizing plate 1 and a GH cell 2. The GH cell 2, which is not shown in the drawings, is sealed between two glass substrates, and has a working electrode and a liquid crystal alignment film (this also applies to the following cases). A positive liquid crystal molecule 3 and a positive dichroic dye molecule 4 are sealed in the GH cell 2.

The positive dichroic dye molecule 4 has anisotropy of light absorption, and is, for example, a positive (p-type) dye molecule. Further, the positive liquid crystal molecule 3 is of the positive type (plus type), whose anisotropy of dielectric constant is positive.

FIG. 12A shows a state of the GH cell 2 during a voltage is not applied thereto (no voltage is applied thereto). Incident light 5 is transmitted by the polarizing plate 1 thereby to be linearly polarized. In FIG. 12A, this polarization direction coincides with a molecular long axis direction of the positive dichroic dye molecule 4. Thus, light is absorbed by the positive dichroic dye molecule 4, so that the light transmittance of the GH cell 2 is reduced.

Further, as shown in FIG. 12B, a voltage is applied to the GH cell 2. As the positive liquid crystal molecule 3 is directed toward the direction of an electrical field, the molecular long axis of the positive dichroic dye molecule 4 is perpendicular to the polarization direction of the linearly polarized light. Therefore, the incident light 5 is transmitted almost without being absorbed by the GH cell 2.

Incidentally, in the case of using a negative type (n-type) dichroic dye molecule, which absorbs light in a molecular short axis direction, conversely to the case of using the positive dichroic dye molecule 4, when no voltage is applied thereto, light is not absorbed, whereas light is absorbed when a voltage is applied thereto.

In the light control device shown in FIGS. 12A and 12B, the ratio of absorbance on application of a voltage to absorbance on application of no voltage, that is, an optical density ratio is about 10. This device has an optical density ratio that is about twice the optical density ratio of the light control apparatus constituted only by the GH cell 2 without using the polarizing plate 1.

On the other hand, ordinary video cameras and digital still cameras each have CCDs (Charge Coupled Devices) for converting the intensity of light into electrical signals. A single CCD has several hundred thousand to several million pixels. Further, a color filter is provided corresponding to each of the pixels. For instance, in a case where a striped pattern or the like having a width, which is equal to that of this colored CCD pixel, is imaged, a part of color signals to be formed originally of three colors, that is, red, green, and blue is lacked. Thus, a color differing from an original color comes out. Also, a non-colored part is colored. Consequently, an image of the pattern or the like is very hard to see under such influences of false signals.

That is, the CCDs perform geometrically discrete sampling. This causes troubles that false color signals and moirés occur when geometrical patterns (of, for example, striped clothes, and tiled walls of buildings) finer than the periodic arrangement of the CCDs are shown, and that images of the patterns causes feeling of incongruity.

As a countermeasure thereagainst, recently, there has generally been employed means for preventing generation of false color signals by installing an optical lowpass filter, which is constituted by a birefringent plate made of quartz or the like, at a front position of the CCD thereby to blur high-frequency components of a striped pattern and so on and to make the striped pattern not to look like stripes and also make it clear which of a striped pattern or a color is shown.

Referring to FIGS. 14A and 14B, which illustrate a concrete principle, when natural light 31 having random oscillating directions is incident upon a birefringent plate 32 made of quartz or the like, the natural light 31 is split into an ordinary ray 33 and an extraordinary ray 34. Thus, a light ray forming an image at a single point is split to those respectively forming images at two points. A splitting axis d can be calculated according to the following equation (1). For instance, the splitting axis d is expressed as being about $5.9 \times 10^{-3} \times t$.

$$d = \frac{(n_e)^2 - (n_o)^2}{2 n_e \cdot n_o} \times t \quad \text{equation (1)}$$

(incidentally, in the equation (1), t designates a thickness of the birefringent plate, and $n_o$ denotes the refractive index of the ordinary ray, and $n_e$ designates the refractive index of the extraordinary ray).

For example, in a case where two birefringent plates differing in crystal axis from each other are combined with each other, as shown in FIG. 15A, what is called rhombic four-point blurring can be performed. In a case where three birefringent plates differing in crystal axis from one another, are combined with one another, as shown in FIG. 15B, what is called seven-point blurring can be performed. Also, in a case of a combination of three plates, in which a phase difference plate is sandwiched by birefringent plates, as shown in FIG. 15C, what is called square four-point blurring can be performed. Incidentally, because pixels are usually formed in a square arrangement in a digital still camera, the square four-point blurring shown in FIG. 15 has generally been employed. However, recently, with miniaturization of CCDs, employment of devices of the type having two birefringent plates made of quartz has been increased, in view of the balance between the necessity for enhancing the frequency characteristics and the cost thereof.

Additionally, regarding the digital cam coders, nearly similar optical lowpass filters have been employed.

However, it turns out that even in a case where the optical lowpass filter is disposed at a front position of the CCD, as shown in FIGS. 12A and 12B, and where an object, whose spatial separation capability is high, is imaged by using an imaging device, on which a light control device constituted by the GH cell 2 and the polarizing plate 1, as shown in FIGS. 12A and 12B, is mounted, a mode constituted by the GH cell 2 and the polarizing plate 1, the action of separation between an ordinary ray and an extraordinary ray due to birefringence does not effectively function owing to the positional relation between the device and the optical axis of each of the birefringent plates, that a deviation of the intensity of the separated ray occurs, and that the effect of preventing the generation of a false color signal is insufficient. Improvement thereon has been desired.

The invention is accomplished to the above-mentioned problems. An object of the invention is to provide a light control device enabled to realize the enhancement of optical functions thereof, and to provide an imaging device enabled to realize the enhancement of the performance, the quality of picture, and the reliability thereof by disposing this light control device in an optical path thereof.

DISCLOSURE OF THE INVENTION

That is, according to the invention, there is provided a light control device provided at a front position of an optical lowpass filter comprising a plurality of birefringent plates, sequentially disposed in an optical path of an imaging system of an imaging device. The light control device comprises a liquid element and a polarizing plate. The direction of a polarization axis of the polarizing plate and that of liquid crystal orientation of the liquid crystal element differ from light ray separation direction of an ordinary ray and an extraordinary ray, which are separated by an optical lowpass filter, and light ray separation directions of said birefringent plates and the direction of the polarization axis of said polarizing plate wholly differ from one another.

Also, according to the invention, there is provided an imaging device in which a light control device having a polarizing plate and a liquid crystal element is disposed at a front position of an optical lowpass filter comprising a plurality of birefringent plates, sequentially disposed in an optical path of an imaging system. The imaging device is configured so that the direction of a polarization axis of the polarizing plate and the direction of a liquid crystal orientation differ from light ray separation direction of an ordinary ray and an extraordinary ray separated by the optical lowpass filter, and light ray separation directions of said birefringent plates and the direction of the polarization axis of said polarizing plate wholly differ from one another.

Incidentally, the "direction of the liquid crystal orientation" means a direction in which liquid crystal molecules are arranged on a substrate surface of a liquid crystal element, that is, a direction (for example, a rubbing direction) in which liquid crystal molecules are aligned when projected on a surface perpendicular to the optical path.

The present inventor zealously studied improvement of the above-mentioned problems of the generation of false color signals and moirés, and, for the first time, knew that in some manners of mounting the liquid crystal element and the polarizing plate, which constitute the light control device, the deviation of the intensity of the separated light occurs and the optical lowpass filter's effect of preventing the generation of false color signals is reduced. The present inventor has attained the invention by ascertaining that it is extremely effective for the improvement thereof to place each of the polarization axis of the polarizing plate, the direction of the liquid crystal alignment of the liquid crystal element, and the light ray separation directions of the birefringent plates which constitute the optical lowpass filter, in an optimal direction, that is, to have the light ray separation directions of said birefringent plates and the direction of the polarization axis of said polarizing plate wholly differ from one another.

According to the invention, the device is configured so that the direction of a polarization axis of the polarizing plate and the direction of a liquid crystal orientation differ from light ray separation direction of an ordinary ray and an extraordinary ray separated by the optical lowpass filter, and the light ray separation directions of said plural birefringent plates and the direction of the polarization axis of said polarizing plate wholly differ from one another. Thus, for instance, when geometrical patterns (of, for example, objects, which have high spatial frequencies, to be imaged, such as striped clothes, and tiled walls of buildings), which are finer than the periodic arrangement of the CCDs, are imaged, no deviation of the intensity of the separated light occurs. The effect of blurring can sufficiently be obtained. Occurrences of false color signals and moirés can effectively be prevented. A picked-up image, which has faithfully reproduced an imaged object and is a more natural image, can be obtained. Even when the directions of the polarization axis and the liquid crystal orientation are parallel to the light ray separation direction, a deviation of the intensity of the separated light occurs, so that the number of the separated light rays decreases, and that the effect of blurring is not obtained.

Therefore, the invention can enhance the optical functions of the light control device and the imaging device and is extremely effective in enhancing the performance, the quality of an image, and the reliability of the device.

BRIEF DESCRIPTION of DRAWINGS

FIG. 1 is a view showing the direction of a polarization axis of a polarizing plate and an example of the configuration of an optical lowpass filter according to a mode for carrying out the invention;

FIG. 2 is a schematic side view illustrating a light control device using a liquid crystal element according to the mode for carrying out the invention;

FIG. 3 is a front view illustrating a mechanical iris of the light control device according to the mode for carrying out the invention;

FIGS. 4A, 4B, and 4C are schematically and partially enlarged views illustrating an operation of the mechanical iris provided in the vicinity of an effective optical path of the light control device according to the mode for carrying out the invention;

BEST MODE FOR CARRYING OUT THE INVENTION

Figure 15A:
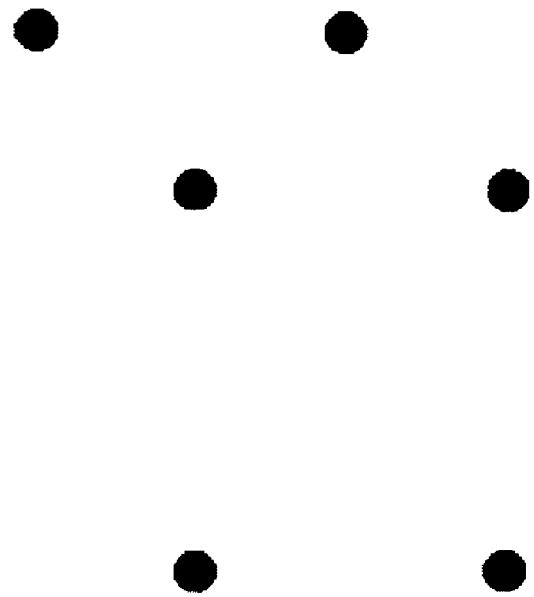
FIGS. 15A, 15B, and 15C are views illustrating an action of the birefringent plate constituting the optical lowpass filter.
Figure 15B:
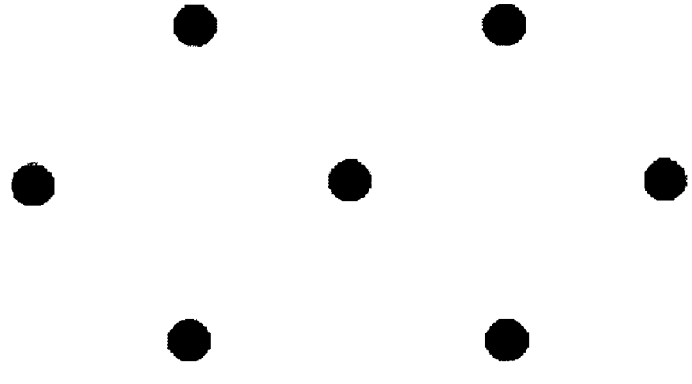
Figure 15C:

In the invention, the direction of the polarization axis of said polarizing plate and that of liquid crystal alignment of said liquid crystal element preferably forms an angle of 45 degrees with at least the light ray separation direction of a birefringent plate that is present closest to a light incidence side among members constituting the optical lowpass filter. Consequently, a light ray, which forms an image at one point, is easily split into those corresponding to square four points, as shown in FIG. 15C. Thus, the device according to the invention can be made to be more suitable for, for example, miniaturization of a CCD (Charge Coupled Device).

Also, it is preferable that the polarization axis of the polarizing plate and the direction of the liquid crystal orientation of the liquid crystal element are perpendicular to each other. Consequently, the ratio of absorbance on application of a voltage to absorbance on application of no voltage (that is, an optical density ratio) is enhanced. The contrast ratio of the light control device is increased. A light control operation can normally be performed at all places from light places to dark places.

According to the light control device and the imaging device based on the present invention, the direction of the polarization axis of the polarizing plate and that of the liquid crystal orientation of the liquid crystal element are set to differ from, for instance, form an angle of 45 degrees with at least the light ray separation direction of the birefringent plate that is present closest to the light incidence side among the members constituting the optical lowpass filter, and the light ray separation directions of said plural birefringent plates and the direction of the polarization asis of said polarizing plate wholly differ from one another. Thus, for example, even in a case where the light control device, the optical lowpass filter, and a CCD element according to the invention are disposed in a casing, and where even when geometrical patterns (of, for example, objects, which have high spatial frequencies, to be imaged, such as striped clothes, and tiled walls of buildings), which are finer than the periodic arrangement of the CCDs, are imaged, no deviation of the intensity of the separated light occurs. The effect of blurring can sufficiently be obtained. The generation of false color signals and moirés can effectively be prevented. A picked-up image, which has faithfully reproduced an imaged object and is a more natural image, can be obtained.

Furthermore, it is preferable that the liquid crystal element is a guest-host liquid crystal element that employs negative liquid crystal molecules as a host material, and that also employs dichroic dye molecules as a guest material.

Such a liquid crystal element is based on the invention described in the earlier application, which the present inventor already filed, according to the Japanese Patent Application No. 11-322186 Official Gazette. In accordance with the invention described of the earlier application, the light control device is constituted by the liquid crystal element and the polarizing plate disposed in the optical path of light that is incident upon this liquid crystal element. Moreover, the ratio of absorbance on application of a voltage to absorbance on application of no voltage (that is, the optical density ratio) is enhanced by using the guest-host liquid crystal that employs negative liquid crystal molecules as the host material. The contrast ratio of the light control device is increased. This enables the device to normally perform a light control operation at all places from light places to dark places.

Figure 12A:
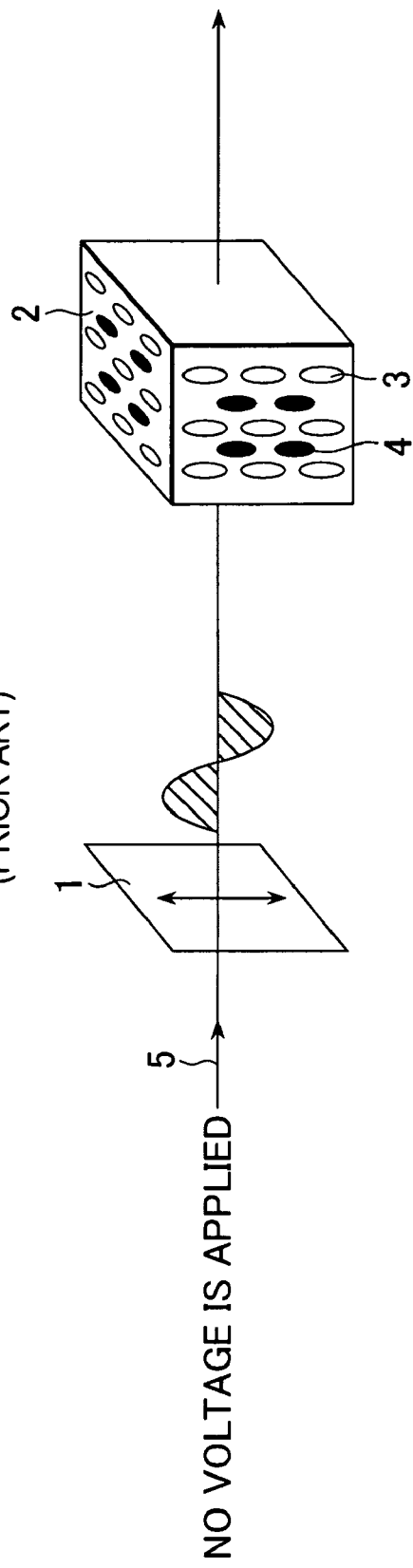
FIGS. 12A and 12B are schematic views illustrating the principle of an operation of a conventional light control device.
Figure 12B:
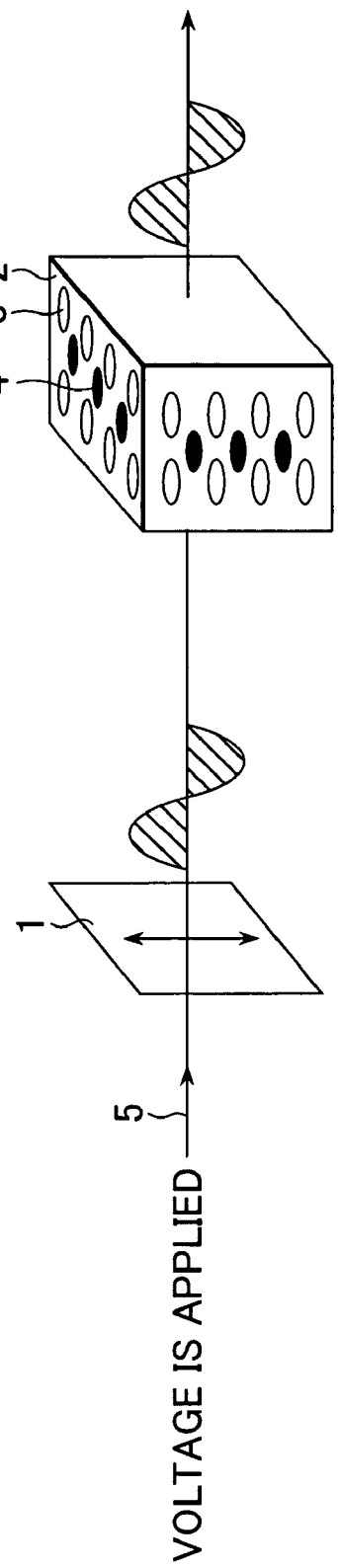
Figure 13:
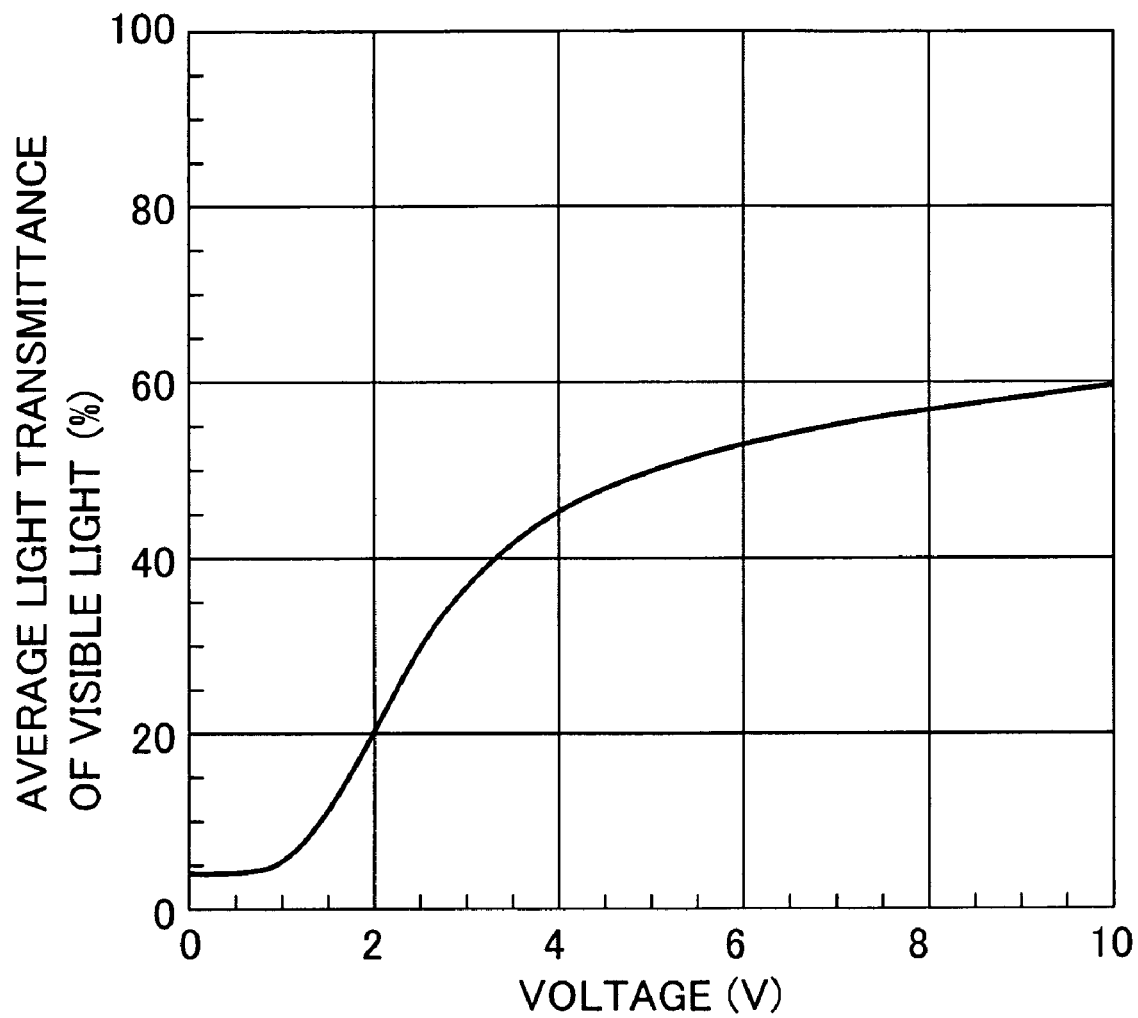
FIG. 13 is a graph illustrating the relation between the light transmittance of the conventional light control device and a drive applied-voltage.
Figure 14A:
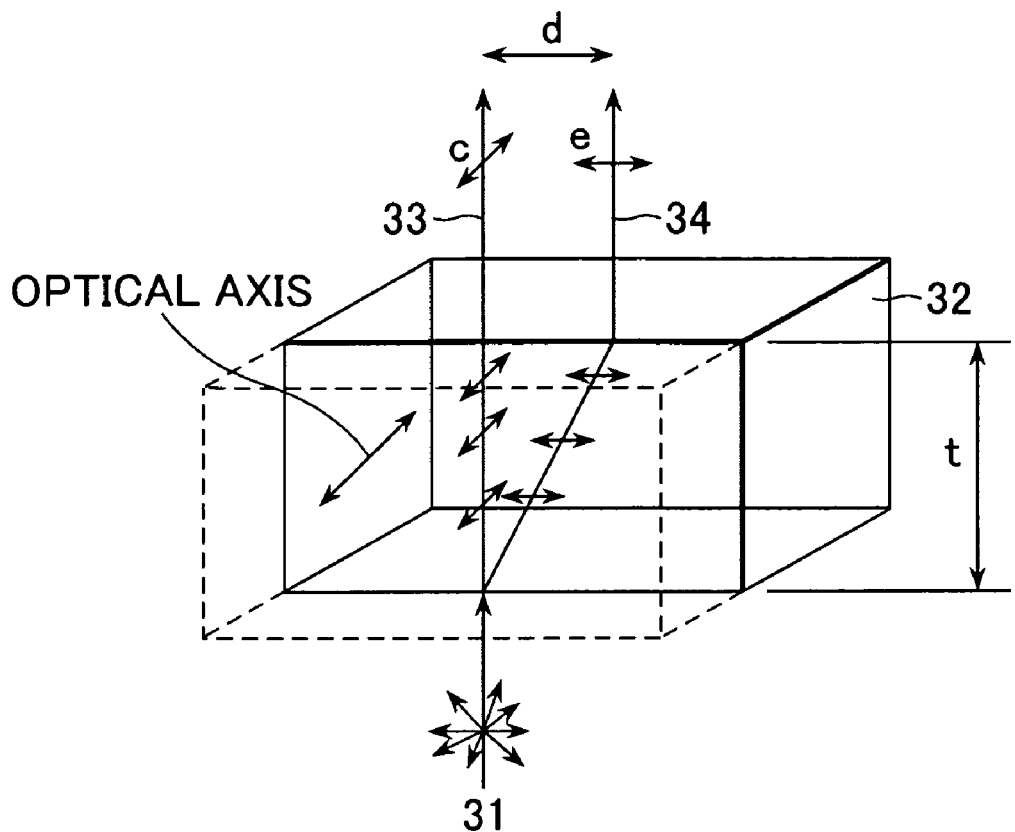
FIGS. 14A and 14B are views illustrating an action of a birefringent plate constituting an optical lowpass filter.
Figure 14B:
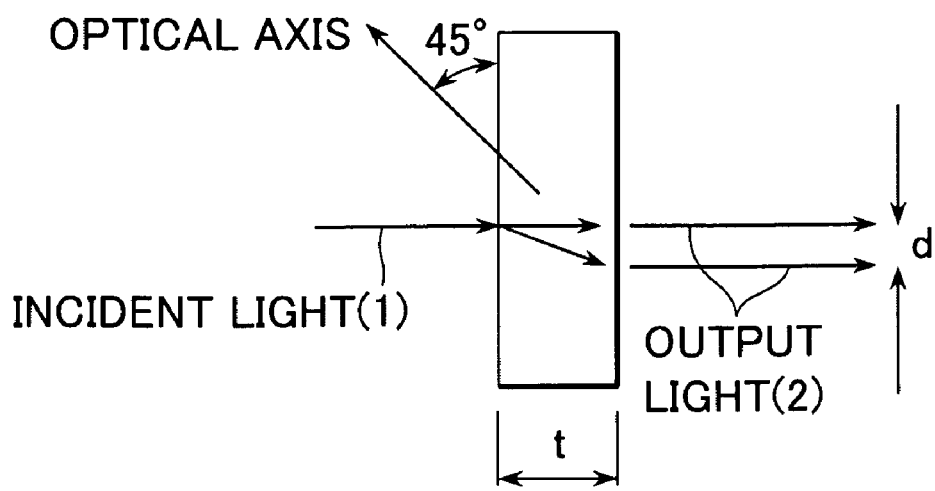

In the guest-host liquid crystal cell (the GH cell) 2 shown in FIGS. 12A and 12B, positive liquid crystal molecules, whose dielectric constant anisotropy ($\Delta\epsilon$) is positive, are used as the host material. Positive dichroic dye molecules 4, whose light absorption anisotropy ($\Delta A$) is positive, are used as the guest material. The polarizing plate 1 is disposed at the light incidence side of the GH cell 2. Change in the light transmittance on the application of an operating voltage is measured by using rectangular waves as drive waves. Thus, as shown in FIG. 13, as the operating voltage is applied, an average light transmittance of visible light (in the air, the transmittance measured by adding the polarizing plate to the liquid crystal is used as a reference (100%): this also applies to the following cases) increases. However, when the voltage is raised to 10 V, a maximum light transmittance is 60% or so. Additionally, the change in the light transmittance is gentle.

This is considered to be because of the facts that the interaction of the liquid crystal molecules in the interface between the liquid crystal alignment film of the liquid crystal cell and each of the liquid crystal molecules is strong on the application of no voltage in the case of using the positive host material, and that thus, even when a voltage is applied thereto, the liquid crystal molecules, whose director does not change (or is difficult to change) orientation thereof, still remain.

Figure 10A:
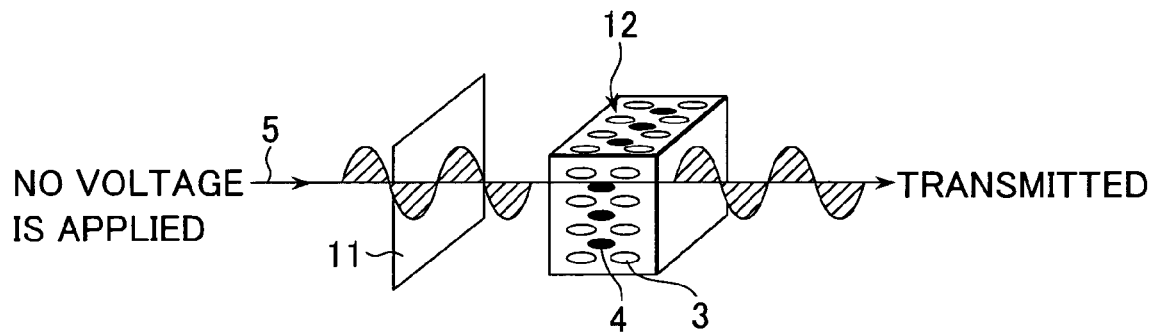
FIGS. 10A, 10B, and 10C are schematic views illustrating the principle of an operation of the light control device according to an invention described in an earlier application (Japanese Patent Application No. 11-322186 Official Gazette)
Figure 10B:
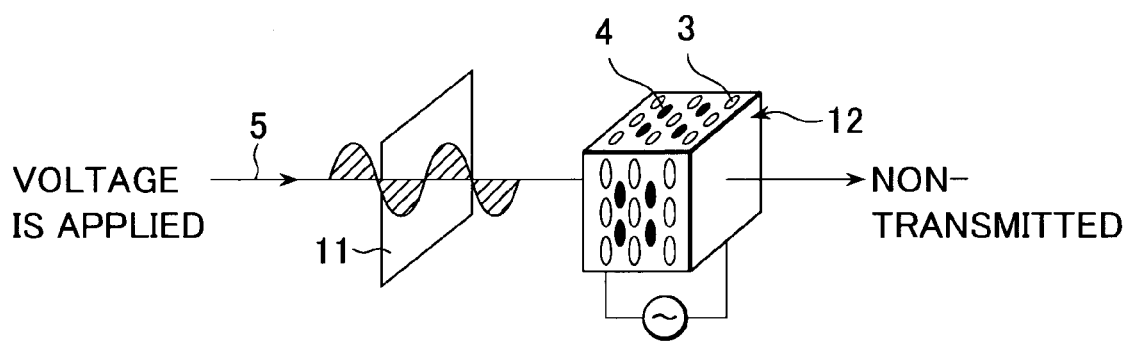
Figure 10C:
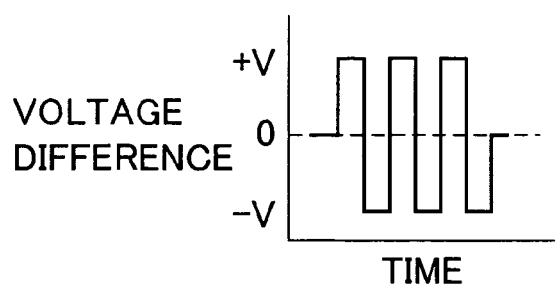
Figure 11:
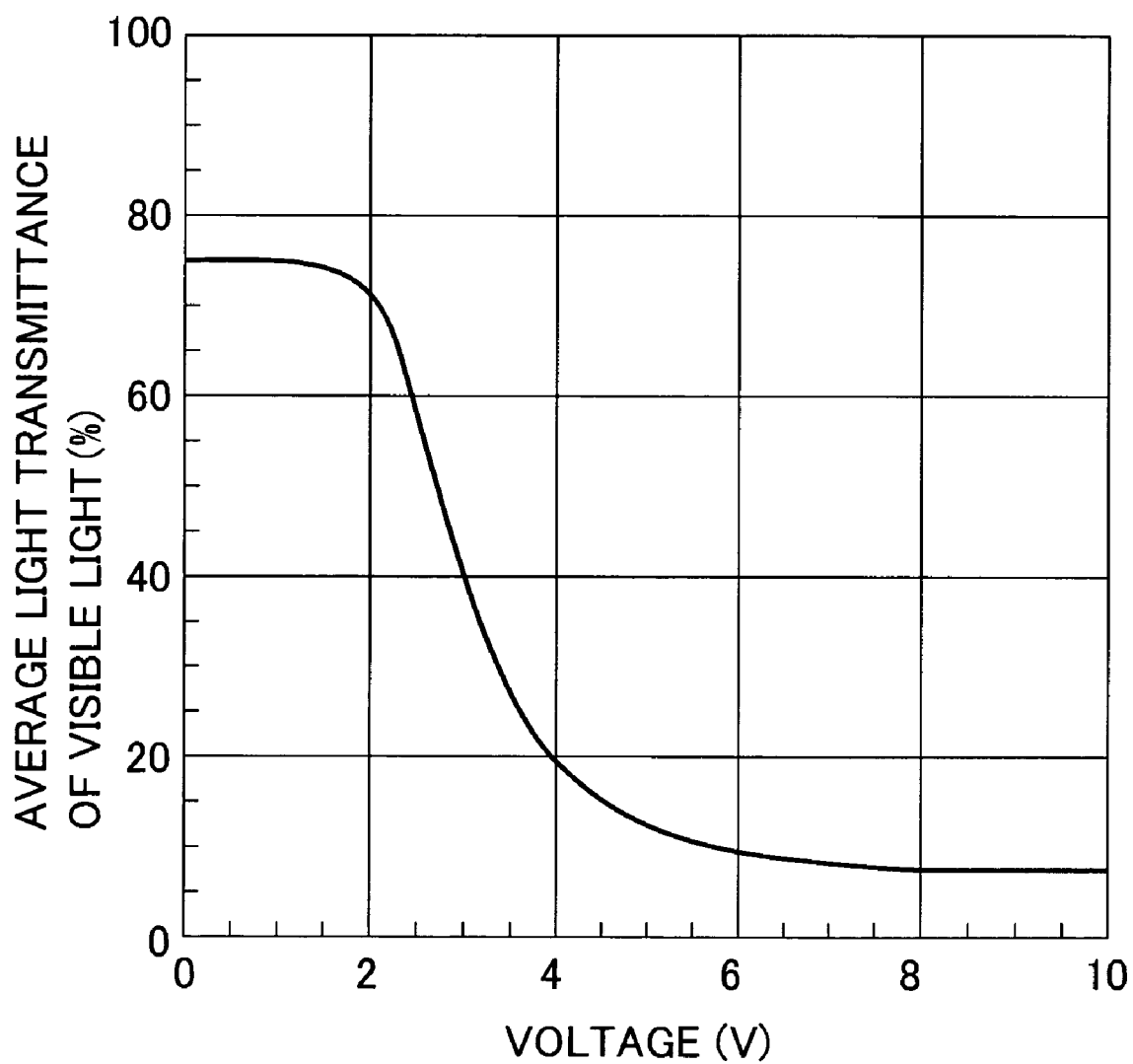
FIG. 11 is a graph illustrating the relation between the light transmittance of a light control device according the invention described in the earlier application and a drive applied-voltage.

In contrast, according to the invention described in the earlier application, as shown in FIGS. 10A to 10C, in the guest-host liquid crystal cell (the GH cell) 12, MLC-6608 manufactured by Merck Ltd., which is a negative liquid crystal whose dielectric constant anisotropy ($\Delta\epsilon$) is positive, is used as the host material. As the guest material, D5, which is positive dichroic dye molecules and manufactured by BDH Ltd., is used by way of example. Thus, the polarizing plate 11 is disposed at the light incidence side of the GH cell 12. Change in the light transmittance on application of the operating voltage was measured by using square waves as drive waves. Thus, it turns out that as the operating voltage is applied, the average light transmittance of visible light (in the air) reduces to several % from the maximum light transmittance of about 75%, as shown in FIG. 11, and that the change in the light transmittance is relatively rapid.

This is considered to be because of the facts that the interaction of the liquid crystal molecules in the interface between the liquid crystal alignment film of the liquid crystal cell and each of the liquid crystal molecules is extremely weak on the application of no voltage in the case of using the negative host material, and that thus, when no voltage is applied, light is easily transmitted, whereas when a voltage is applied thereto, the orientation of the director of the liquid crystal molecule is liable to change.

Thus, according to the invention, the GH cell 12 is constituted by using the negative host material thereby to enhance the light transmittance (especially, when the cell is transparent) and to realize a more compact light control device enabled to use the GH cell 12 by fixing the position thereof in the imaging optical system without change. In this case, the polarizing plate is disposed in the optical path of light that is incident upon the liquid crystal element. Consequently, the ratio of absorbance on application of a voltage to absorbance on application of no voltage (that is, the optical density ratio) is further enhanced. The contrast ratio of the light control device is further increased. A light control operation can normally be performed at all places from light places to dark places.

Incidentally, in the device of the invention, preferably, the liquid crystal element is negative liquid crystal molecules whose dielectric constant anisotropy is negative. However, the guest material may be constituted by positive or negative dichroic dye molecules. Further, although it is preferable that the host material is negative liquid crystal molecules, positive liquid crystal molecules may be used as the host material.

In the device of the invention, the negative (or positive) host material and the positive (or negative) guest material can be selected from known materials. Incidentally, in the case of practically using the device, the device may use a composition obtained by selecting and blending the materials in such a way as to show a nematic property in a practical operating temperature range.

Further, it is preferable that the polarizing plate 11 constituting this light control device is enabled to be taken in and out of an effective optical path of light, which is incident upon the GH cell 12, as shown in FIG. 2, similarly to the polarizing plate according to the invention described in the earlier application that is filed by the applicant of the present application. Concretely, the polarizing plate 11 can be taken out of the effective optical path by being moved to a position indicated by imaginary lines. A mechanical iris shown in FIG. 3 may be used as the means for taking this polarizing plate 11 therein and out therefrom.

This mechanical iris is a mechanical iris diaphragm generally used in a digital still camera and a video camera, and the like, and mainly comprises two iris blades 18, 19, and the polarizing plate 11 attached to the iris blade 18. The iris blades 18 and 19 can be moved in an up-down direction. In a direction indicated by an arrow 21, the relative movement of the iris blades 18 and 19 is performed by using the drive motor (not shown).

Consequently, as shown in FIG. 3, the iris blades 18 and 19 are partially overlapped with each other. When these blades largely overlap with each other, an opening 22 positioned near the center between the iris blades 18 and 19 on the effective optical path 20 is covered with the polarizing plate 11.

FIGS. 4A to 4C are partially enlarged views illustrating the mechanical iris provided in the vicinity of the effective optical path 20. Simultaneously with the downward movement of the iris blade 18, the iris blade 19 upwardly moves. Along with this, the polarizing plate 11 attached to the iris blade 18 is moved out of the effective optical path 20, as illustrated in FIG. 4A. Conversely, the iris blades 18 and 19 are overlapped with each other by moving the iris blade 18 upwardly, and also moving the iris blade 19 downwardly. Consequently, as shown in FIG. 4B, the polarizing plate 11 is moved onto the effective optical path 20 and gradually covers the opening 22. When the iris blades 18 and 19 largely overlap with each other, the polarizing plate 11 covers the entire opening 22, as shown in FIG. 4C.

Next, a light control operation of the light control device using this mechanical iris is described.

As an object (not shown) to be imaged becomes brighter, the iris blades 18 and 19 having been opened in the up-down direction are driven by a motor (not shown), and start overlapping with each other, as shown in FIG. 4A. Thus, the polarizing plate 11 attached to the iris blade 18 starts going onto the effective optical path 20, and covers a part of the opening 22 (FIG. 4B).

At that time, the GH cell 12 is in a state in which the GH cell 12 does not absorb light (incidentally, light is slightly absorbed by the GH cell 12 due to thermal fluctuation, or surface reflection, or the like). Thus, the intensity distribution of light transmitted by the polarizing plate 11 is substantially the same as that of light having passed through the opening 22.

Thereafter, the polarizing plate 11 is put into a state in which the polarizing plate 11 completely covers the opening 22 (FIG. 4C). In a case where the object becomes brighter still more, the light control operation is performed by raising the voltage supplied to the GH cell 12 and absorbing light through the use of the GH cell 12.

Conversely, in a case where the object becomes dark, the effect of absorbing light through the use of the GH cell 12 is reduced by decreasing the voltage applied to the GH cell 12 or applying no voltage thereto. In a case where the object becomes darker, the iris blade 18 is downwardly moved, and the iris blade 19 by driving the motor (not shown). Thus, the polarizing plate 11 is moved outwardly from the effective optical path 20 (FIG. 4A).

In the above-mentioned way, the polarizing plate 11 (whose transmittance ranges, for example, 40% to 50%) can be moved out of the effective optical path of light. Thus, light is not absorbed by the polarizing plate 11. Therefore, the maximum light transmittance of the light control device can be increased by a factor of, for instance, two or more. Concretely, the maximum light transmittance of this light control device is about twice that of the conventional light control device constituted by the polarizing plate and the GH cell, which are fixedly installed therein. Incidentally, both the control devices are equal in the minimum light transmittance to each other.

Additionally, the polarizing plate 11 is taken in and out by using the mechanical iris, which is put in practical use in digital camera and the like. Thus, the light control device can easily be realized. Also, because the GH cell 12 is used, in addition to the light control operation performed by the polarizing plate 11, a light control operation is conducted by the absorption of light by the GH cell 12 itself.

Thus, this light control device is enabled to enhance a light-dark contrast ratio and maintain a substantially uniform light quantity distribution.

Hereinafter, preferred examples of the invention are described with reference to the accompanying drawings.

EXAMPLE 1

First, an example of the light control device using the guest-host liquid crystal (GH) cell is described.

The light control device according to the invention is disposed at a front position of the optical lowpass filter comprising said plurality of birefringent plates, sequentially disposed in the optical path of the imaging system of the imaging device, and has the polarizing plate 11 and the GH cell 12, which are arranged in this order.

Incidentally, as shown in FIG. 1A, the optical lowpass filter 55b comprises a birefringent plate 32a whose light ray separation direction from the light incidence side is a horizontal direction, a quarter-wave phase difference plate (whose thickness is, for example, about 0.5 mm) 24, and a birefringent plate 32b whose light ray separation direction is a perpendicular direction, and the light ray separation directions of the birefringent plates 32a and 32b, and the direction of the polarization asis 14 of the polarizing plate 11 wholly differ from one another.

The GH cell 12 is configured so that a mixture of negative liquid crystal molecules (a host material) and a positive or negative dichroic dye molecules (a guest material) is sealed between two glass substrates (both are not shown), on each of which a transparent electrode and an alignment film are formed.

The MLC-6608 manufactured by Merck Ltd., which is a negative liquid crystal whose dielectric constant anisotropy) is positive, was used as an example of the liquid crystal molecules. As the positive dichroic dye molecules 4, D5, which is positive dichroic dye molecules absorbing light in the molecular long axis direction and manufactured by BDH Ltd., was used as an example thereof. The light absorption axis of the polarizing plate 11 was set to be perpendicular to that at the time of applying a voltage to the GH cell 12.

Figure 5:
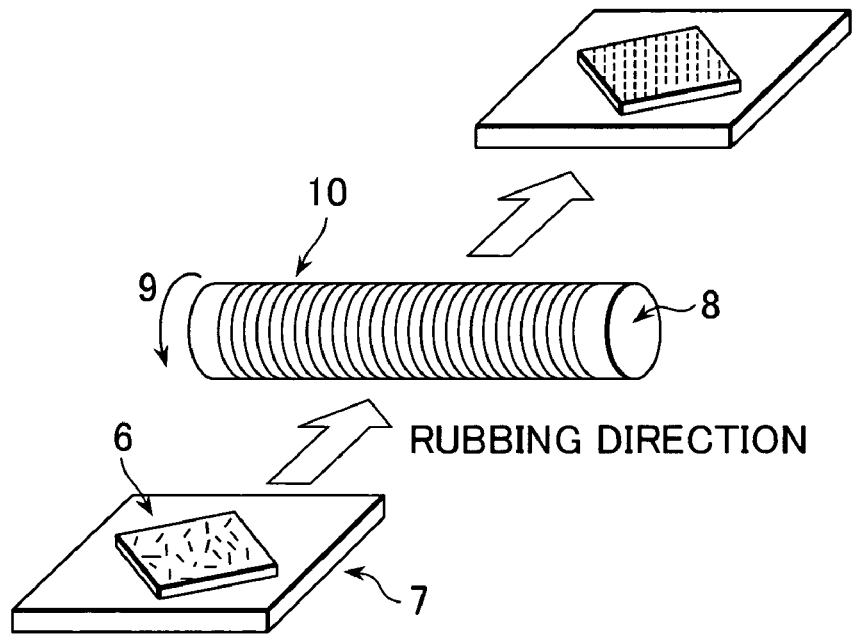
FIG. 5 is a view illustrating the process of rubbing a liquid crystal alignment film in manufacturing the liquid crystal element according to the mode for carrying out the invention.

Further, a liquid crystal orientation process was performed by using an ordinary rubbing method as illustrated in FIG. 5. According to the rubbing method, the alignment process performed on the molecules toward the direction of rotation of a roller 8 can be performed by installing a substrate 6, which is provided with an alignment film, on a stage 7 of a rubbing device and causing the roller 8, which has a rubbing cloth 10, to pass therethrough.

Furthermore, as shown in FIG. 1A, a polarization axis 14 of the polarizing plate 11 to be inserted to the optical path was disposed by being inclined 45 degrees, that is, in such a way as to form an angle of 45 degrees with each of (horizontal and vertical) light ray separation directions of the birefringent plates 32a and 32b constituting an optical lowpass filter 55b.

Figure 6:
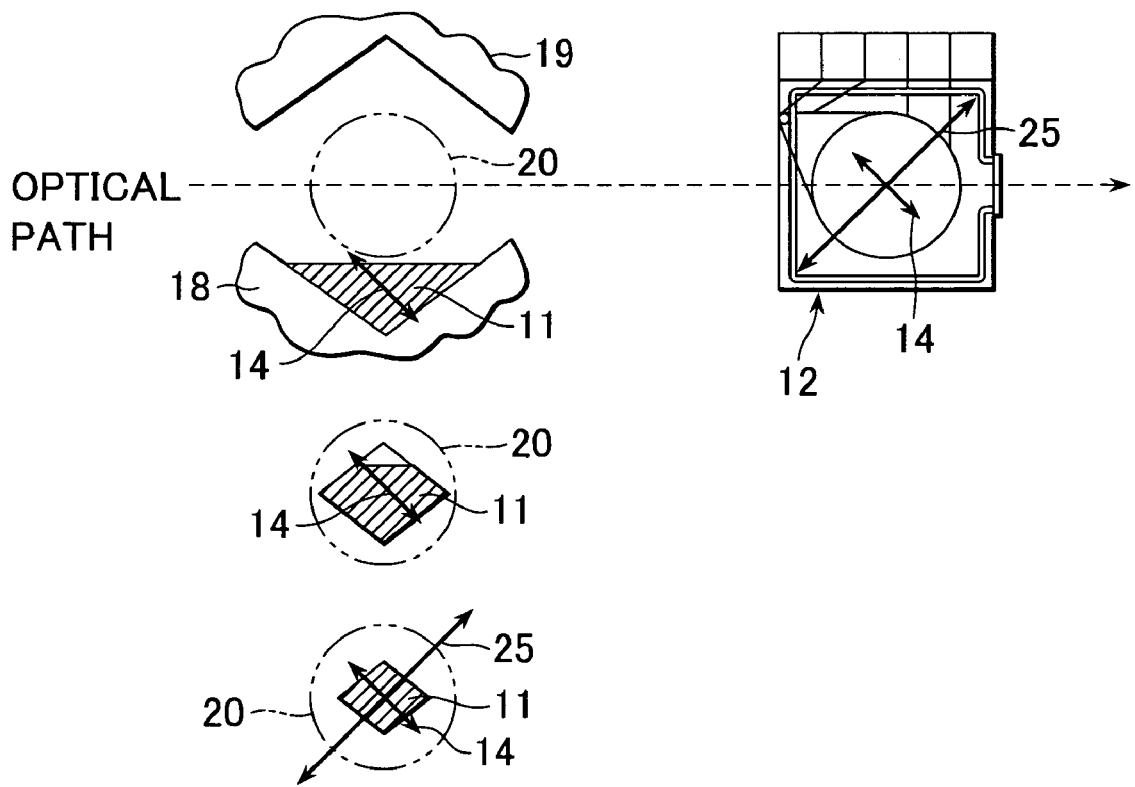
FIG. 6 is a view illustrating an example of the combination of the directions of the polarization axis of the polarizing plate and the liquid crystal orientation of the liquid crystal element according to the mode for carrying out the invention.

Further, as shown in FIG. 6, the device was configured so that the direction of the liquid crystal orientation of the GH cell 12 and the direction of the polarization axis 14 of the polarizing plate 11 were perpendicular to each other.

The light control device 23 constituted by this polarizing plate 11 and the GH cell 12 is disposed between a front lens group 15 and a rear lens group 16, each of which is constituted by a plurality of lenses like a zoom lens, as illustrated in, for example, FIG. 2. Light having passed through the front lens group 15 is linearly polarized through the polarizing plate 11, and then incident upon the GH cell 12. Light having passed through the GH cell 12 is converged by the rear lens group 16, and projected on an imaging surface 17 as an image.

Incidentally, in the case of a light ray separation pattern 60 according to Example 1, a light ray, which forms an image at one point, is split into those corresponding to square four points, as shown in FIG. 1A. Further, a splitting axis D at that time can be expressed as being about 0.0059×T where T designates the thickness of each of two birefringent plates 32a and 32b.

The light control device according to Example 1 is configured so that the direction of the polarization axis 14 of the polarizing plate 11 and the direction of the liquid crystal orientation 25 of the GH cell 12 form an angle of 45 degrees with the light ray separation directions of the birefringent plates 32a and 32b constituting the optical lowpass filter 55b, and the light ray separation directions of the birefringent plates 32a and 32b constituting the optical lowpass filter and the direction of the polarization axis 14 of the polarizing plate 11 wholly differ one another. Thus, for example, even in a case where the light control device, the optical lowpass filter 55b, and the CCD element according to Example 1 are disposed in a casing, and where even when geometrical patterns (of, for example, objects, which have high spatial frequencies, to be imaged, such as striped clothes, and tiled walls of buildings), which are finer than the periodic arrangement of the CCDs, are imaged, no deviation of the intensity of the separated light occurs. The effect of blurring can sufficiently be obtained. The generation of false color signals and moirés can effectively be prevented. A picked-up image, which has faithfully reproduced an imaged object and is a more natural image, can be obtained.

Further, the GH cell 12 is constituted by using the negative host material thereby to enhance the light transmittance (especially, when the cell is transparent) and to realize a more compact light control device enabled to use the GH cell 12 by fixing the position thereof in the imaging optical system without change. In this case, the polarizing plate is disposed in the optical path of light that is incident upon the liquid crystal element. Consequently, the ratio of absorbance on application of a voltage to absorbance on application of no voltage (that is, the optical density ratio) is further enhanced. The contrast ratio of the light control device is further increased. A light control operation can normally be performed at all places from light places to dark places.

Incidentally, the polarizing plate 11 constituting this light control device can be taken in and out of the effective optical path 20 of light that is incident upon the GH cell 12, similarly to the invention described in the earlier application filed by the applicant of the present application.

Concretely, as shown in FIG. 2, the polarizing plate 11 can be taken out of the effective optical path 20 of light by being moved to a position indicated by imaginary lines. The mechanical iris shown in FIGS. 3 and 4 may be used as the means for taking this polarizing plate 11 therein and out therefrom.

EXAMPLE 2

The differences between Example 2 and Example 1 reside in that the members constituting the optical lowpass filter of Example 2 differ from those of Example 1, and that the direction of the polarization axis of the polarizing plate and the direction of the liquid crystal orientation of the GH cell are changed so as to correspond to this optical lowpass filter.

That is, in Example 2, as shown in FIG. 1B, the optical lowpass filter 55b comprises a birefringent plate 32b whose light ray separation direction is a perpendicular direction, and two birefringent plates 32c and 32d, whose light ray separation directions are apart therefrom 45 degrees, and the light ray separation directions of the birefringent plates 32b, 32c and 32d, and the direction of the polarization axis 14 of the polarizing plate 11 completely differ one another.

Furthermore, the polarizing plate 11 was disposed so that the direction of the polarization axis 14 was a horizontal direction. That is, the device was configured so that the direction of the polarization axis 14 of the polarizing plate 11 differed from the light ray separation directions of the birefringent plates 32b, 32c, and 32d constituting the optical lowpass filter 55b, and the light ray separation directions of the birefringent plates 32b, 32c and 32d, and the direction of the polarization axis 14 of the polarizing plate 11 wholly differ one another.

Figure 7:
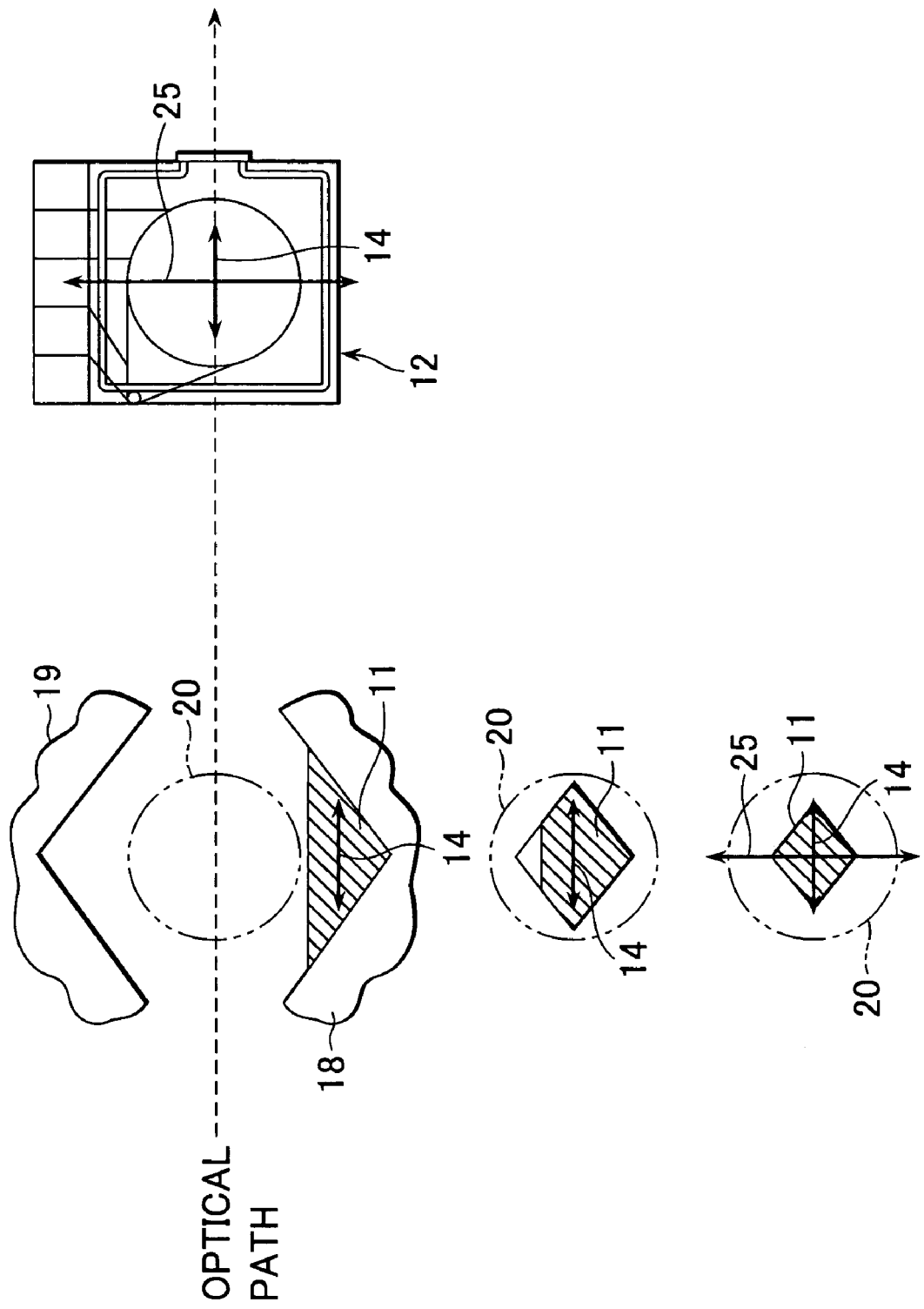
FIG. 7 is a view illustrating an example of the combination of the directions of the polarization axis of the polarizing plate and the direction of the liquid crystal alignment of the liquid crystal element according to the mode for carrying out the invention.

Further, as shown in FIG. 7, the device was configured so that the direction of the liquid crystal orientation 25 of the GH cell 12 and the direction of the polarization axis 14 of the polarizing plate 11 were perpendicular to each other.

In the case of a light ray separation pattern 60 according to Example 2, a light ray, which forms an image at one point, is split into those corresponding to square four points, as shown in FIG. 1(B). Further, a splitting axis D at that time can be expressed as being about 0.0059×T where the thickness of the birefringent plate 32b, whose light ray separation direction is a perpendicular direction, is designated by T, and the thickness of each of the birefringent plates 32c and 32d, whose light ray separation directions are apart therefrom 45 degrees, is set to be $$\frac{T}{\sqrt{2}}.$$

The light control device according to Example 2 is configured so that the direction of the polarization axis 14 of the polarizing plate 11 and the direction of the liquid crystal orientation 25 of the GH cell 12 differ from the light ray separation directions of the birefringent plates 32b, 32c and 32d constituting the optical lowpass filter 55b, and the light ray separation directions of the birefringent plates 32b, 32c and 32d, and the direction of the polarization axis 14 of the polarizing plate 11 wholly differ one another. Thus, for example, even in a case where the light control device, the optical lowpass filter 55b, and the CCD element according to Example 2 are disposed in a casing, and where even when geometrical patterns (of, for example, objects, which have high spatial frequencies, to be imaged, such as striped clothes, and tiled walls of buildings), which are finer than the periodic arrangement of the CCDs, are imaged, the generation of false color signals and moirés can more effectively be prevented, and a picked-up image, which has faithfully reproduced an imaged object and is a further more natural image, can be obtained, similarly to Example 1.

EXAMPLE 3

The differences between Example 3 and Example 1 reside in that the members constituting the optical lowpass filter of Example 3 differ from those of Example 1, and that the direction of the polarization axis of the polarizing plate and the direction of the liquid crystal orientation of the GH cell are changed so as to correspond to this optical lowpass filter.

That is, in Example 3, as shown in FIG. 1C, the optical lowpass filter 55b comprises a birefringent plate 32a whose light ray separation direction is a horizontal direction, and two birefringent plates 32e and 32c, whose light ray separation directions are apart therefrom 45 degrees, and the light ray separation directions of the birefringent plates 32a, 32e and 32c, and the direction of the polarization axis 14 of the polarizing plate 11 wholly differ one another.

Further, the polarizing plate 11 was disposed so that the direction of the polarization axis 14 was a perpendicular direction. That is, the device was configured so that the direction of the polarization axis 14 of the polarizing plate 11 differed from the light ray separation directions of the birefringent plates 32a, 32e, and 32c constituting the optical lowpass filter 55b, and the light ray separation directions of the birefringent plates 32a, 32e and 32c, and the direction of the polarization axis 14 of the polarizing plate 11 wholly differ one another.

Further, the device was configured so that the direction of the liquid crystal orientation 25 of the GH cell 12 and the direction of the polarization axis 14 of the polarizing plate 11 were perpendicular to each other.

In the case of a light ray separation pattern 60 according to Example 3, a light ray, which forms an image at one point, is split into those corresponding to square four points, as shown in FIG. 1C. Further, a splitting axis D at that time can be expressed as being about 0.0059×T where the thickness of the birefringent plate 32a, whose light ray separation direction is a horizontal direction, is designated by T, and the thickness of each of the birefringent plates 32e and 32c, whose light ray separation directions are apart therefrom 45 degrees, is set to be $$\frac{T}{\sqrt{2}}.$$

The light control device according to Example 3 is configured so that the direction of the polarization axis 14 of the polarizing plate 11 and the direction of the liquid crystal orientation 25 of the GH cell 12 differ from the light ray separation directions of the birefringent plates 32a, 32e and 32c constituting the optical lowpass filter 55b, and the light ray separation directions of the birefringent plates 32a, 32e and 32c, and the direction of the polarization axis 14 of the polarizing plate 11 wholly differ one another. Thus, for example, even in a case where the light control device, the optical lowpass filter 55b, and the CCD element according to Example 3 are disposed in a casing, and where even when geometrical patterns (of, for example, objects, which have high spatial frequencies, to be imaged, such as striped clothes, and tiled walls of buildings), which are finer than the periodic arrangement of the CCDs, are imaged, the generation of false color signals and moirés can more effectively be prevented, and a picked-up image, which has faithfully reproduced an imaged object and is a further more natural image, can be obtained, similarly to Example 1.

EXAMPLE 4

The differences between Example 4 and Example 1 reside in that the members constituting the optical lowpass filter of Example 4 differ from those of Example 1, and that the direction of the polarization axis of the polarizing plate and the direction of the liquid crystal orientation of the GH cell are changed so as to correspond to this optical lowpass filter.

That is, in Example 4, as shown in FIG. 1D, the optical lowpass filter 55b comprises a birefringent plate 32a whose light ray separation direction is a horizontal direction, and a birefringent plate 32d, whose light ray separation direction is apart therefrom 45 degrees, and the light ray separation directions of the birefringent plates 32a, 32d, and the direction of the polarization axis 14 of the polarizing plate 11 wholly differ one another.

Further, the polarizing plate 11 was disposed so that the direction of the polarization axis 14 was a perpendicular direction. That is, the device was configured so that the direction of the polarization axis 14 of the polarizing plate 11 differed from the light ray separation directions of the birefringent plates 32a and 32d constituting the optical lowpass filter 55b, and the light ray separation directions of the birefringent plates 32a, 32d, and the direction of the polarization axis 14 of the polarizing plate 11 wholly differ one another.

Further, the device was configured so that the direction of the liquid crystal orientation 25 of the GH cell 12 and the direction of the polarization axis 14 of the polarizing plate 11 were perpendicular to each other.

In the case of a light ray separation pattern 60 according to Example 4, a light ray, which forms an image at one point, is split into those corresponding to rhombic four points, as shown in FIG. 1D. Further, a splitting axis D at that time can be expressed as being about 0.0059×T where the thickness of the birefringent plate 32a, whose light ray separation direction is a horizontal direction, is designated by T, and the thickness of the birefringent plate 32d, whose light ray separation direction is apart therefrom 45 degrees, is set to be $$\frac{T}{\sqrt{2}}.$$

The light control device according to Example 4 is configured so that the direction of the polarization axis 14 of the polarizing plate 11 and the direction of the liquid crystal orientation 25 of the GH cell 12 differ from the light ray separation directions of the birefringent plates 32a and 32d constituting the optical lowpass filter 55b, and the light ray separation directions of the birefringent plates 32a, 32d, and the direction of the polarization axis 14 of the polarizing plate 11 wholly differ one another. Thus, for example, even in a case where the light control device, the optical lowpass filter 55b, and the CCD element according to Example 4 are disposed in a casing, and where even when geometrical patterns (of, for example, objects, which have high spatial frequencies, to be imaged, such as striped clothes, and tiled walls of buildings), which are finer than the periodic arrangement of the CCDs, are imaged, the generation of false color signals and moirés can more effectively be prevented, and a picked-up image, which has faithfully reproduced an imaged object and is a further more natural image, can be obtained, similarly to Example 1.

EXAMPLE 5

Figure 8:
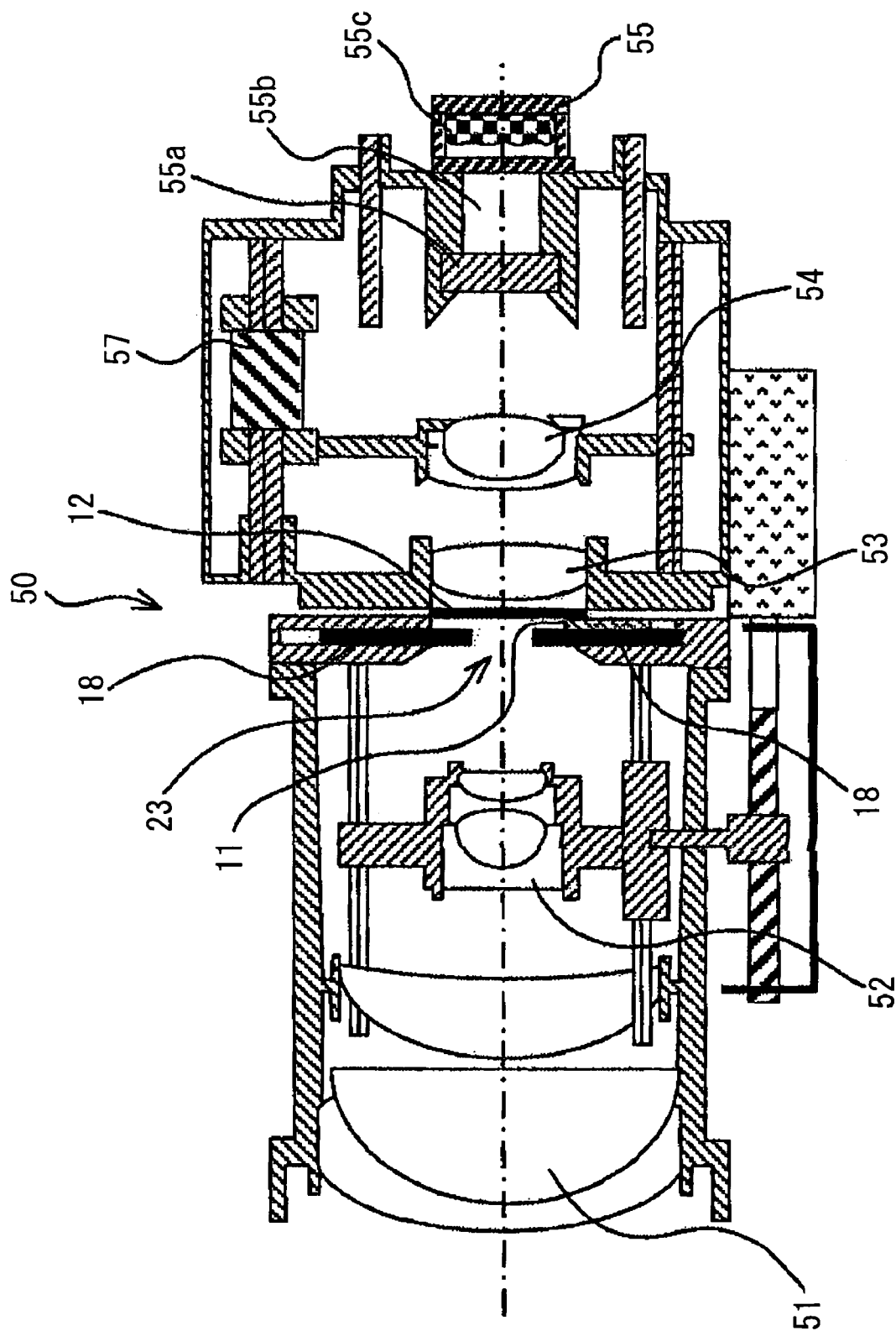
FIG. 8 is a schematic cross-sectional view illustrating a camera system incorporating the light control device according to the mode for carrying out the invention.

FIG. 8 shows an example of incorporating the light control device according to Example 1 into a CCD (Charge Coupled Device) camera.

That is, in the CCD camera 50, along the optical axis indicated by a dot-dash line, a first group lens 51 and a second group lens (for zooming) 52, which correspond to the front lens group 15, a third group lens 53 and a fourth group lens 54 (for focusing), which correspond to the rear lens group 16, and a CCD package 55 are disposed at appropriate intervals in this order. In the CCD package 55, an infrared ray cut-off filter 55a, an optical lowpass filter 55b, and a CCD imaging element 55c are accommodated.

The light control device according to the invention, which comprises the polarizing plate 11 and the GH cell 12, are disposed between the second group lens 52 and the third group lens 53 in such a way as to be closer to the third group lens 53. Incidentally, the fourth group lens 54 for focusing is disposed in such a manner as to be movable by using a linear motor along the optical path between the third group lens 53 and the CCD package 55. Also, the second group lens 54 for zooming is disposed in such a way as to be movable between the first group lens 51 and the light control device 23.

Figure 9A:
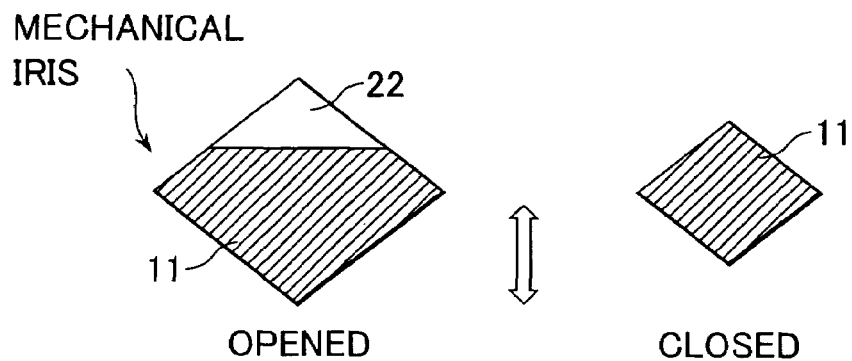
FIGS. 9A and 9B are views illustrating an algorithm for controlling the light transmittance in the camera system according to the mode for carrying out the invention.
Figure 9B:
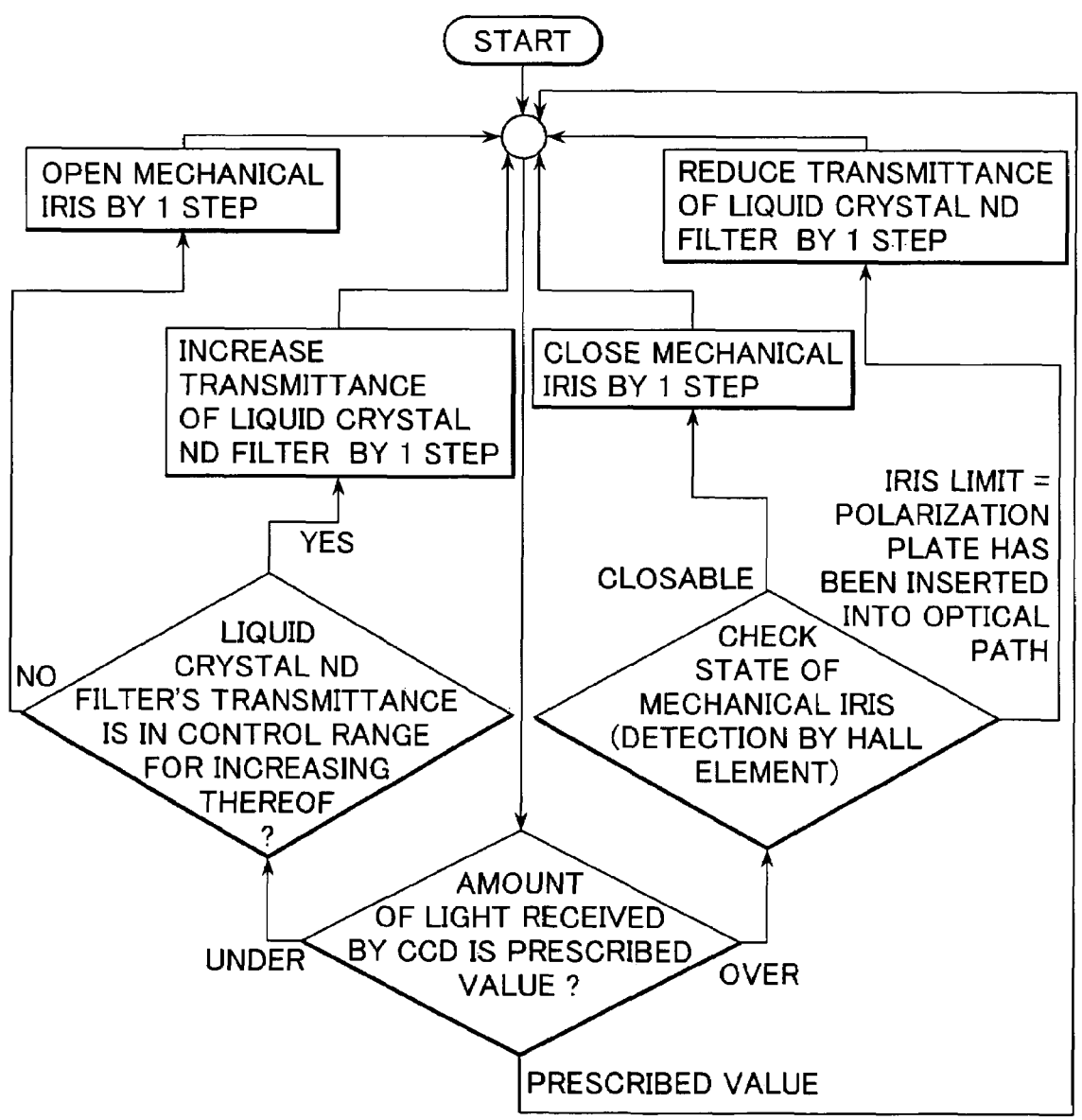

FIG. 9 illustrates an algorithm of a control sequence for controlling the light transmittance by using the light control device 23 in this camera system.

According to this Example, the light control device 23 based on the invention is provided between the second group lens 52 and the third group lens 53. Thus, as above-mentioned, the quantity of light can be controlled by applying a voltage. The system can be miniaturized and reduced in size to substantially the size of the effective range of the optical path. Consequently, the miniaturization of a CCD camera can be achieved. Further, the quantity of light can appropriately be controlled according to the magnitude of the voltage applied to patterned electrodes. Thus, a diffraction phenomenon, which would occur in the conventional device, can be prevented from occurring. A sufficient quantity of light is incident upon the imaging element. Consequently, the blurring of an image can be prevented.

Although Examples according to the invention have been described in the foregoing description, the above-mentioned Examples may be modified in various manners according to the technical ideas according to the invention.

Needless to say, for example, the sample structure, the used materials, the drive method for the GH cell 12, the configuration of the light control device, and so fourth can be appropriately selected without departing the spirit and scope of the invention.

Furthermore, although examples using the most ordinary rubbing method as the method for establishing the liquid crystal alignment of the GH cell 12 have been described in the description of Examples, the invention can be applied to cases of using liquid crystal alignment method that employ an oblique evaporation film, a light alignment film or structures or the like formed by polarized radiation.

Additionally, although the example of using Pulse Height Modulation (PHM) as the drive method for the GH cell 12 has been described in the foregoing description, the invention can be applied to a case of driving the GH cell according to Pulse Width Modulation (PWM).

Furthermore, in addition to the above-mentioned GH cells, a GH cell of a two-layer structure may be used as the GH cell 12. The position of the polarizing plate 11 with respect to the GH cell 12 may be set at an optimal place determined according to conditions for setting an imaging lens.

Further, although the example, in which absorption of light is performed by the GH cell 12 after a light control operation is first performed by taking the polarizing plate 11 therein or out therefrom, has been described, conversely, the operation of controlling light by absorbing light through the use of the GH cell 12 may be first performed. In this case, it is preferable that the light control operation by taking the polarizing plate 11 in and out is performed after the transmittance of the GH cell 12 is reduced to a predetermined value.

Furthermore, although the mechanical iris is used as the means for taking the polarizing plate 11 into and out of the effective optical path 20 in Example, this means is not limited thereto. The polarizing plate 11 may be taken in and out by a film, to which the polarization plate 11 is attached, may be directly provided in the drive motor.

The number of the iris blades 18 and 19 is not limited to 2. A larger number of iris blades may be used. Conversely, only one iris blade may be used. Additionally, although the iris blades 18, 19 are overlapped by being moved in the up-down direction, the iris blades may be moved in other directions. The iris may be closed from the periphery thereof to the center thereof.

Further, although the polarizing plate 11 is attached to the iris blade 18, the polarization plate 11 may be attached to the iris blade 19.

Furthermore, the light control device according to the invention may be used by being combined with other known filter materials (for example, an organic electrochromic material, a liquid crystal, an electroluminescent material, and the like).

Additionally, the light control device according to the invention can be applied to various optical systems, for instance, means for controlling the quantity of light in an electrophotographic copier and optical communication equipment and the like in addition to the optical diaphragm of the imaging device, such as the CCD camera. Moreover, the light control device according to the invention can be applied to various kinds of image display devices for displaying characters and images, in addition to the optical diaphragm and the filter.

Further, in addition to the CCDs used in Example, CMOS image sensors may be applied as pickup devices used in the device according to the invention.

INDUSTRIAL APPLICABILITY

According to the invention, the device is configured so that the direction of a polarization axis of the polarizing plate and the direction of a liquid crystal orientation differ from light ray separation direction of an ordinary ray and an extraordinary ray separated by the optical lowpass filter, and the light ray separation directions of said birefringent plates constituting the optical filer, and the direction of the polarization axis of said polarizing plate wholly differ from one another. Thus, for instance, when geometrical patterns (of, for example, objects, which have high spatial frequencies, to be imaged, such as striped clothes, and tiled walls of buildings striped clothes, and tiled walls of buildings), which are finer than the periodic arrangement of the CCDs, are imaged, no deviation of the intensity of the separated light occurs. The effect of blurring can sufficiently be obtained. Occurrences of false color signals and moirés can effectively be prevented. A picked-up image, which has faithfully reproduced an imaged object and is a more natural image, can be obtained. Even when the directions of the polarization axis and the liquid crystal orientation are parallel to the light ray separation direction, a deviation of the intensity of the separated light occurs, so that the number of the separated light rays decreases, and that the effect of blurring is not obtained.

Consequently, the invention can enhance the optical functions of the light control device and the imaging device and is extremely effective in enhancing the performance, the quality of an image, and the reliability of the device.

The invention claimed is:

1. A light control device for an imaging apparatus, comprising:
    a plurality of birefringent plates,
    a liquid crystal element and a polarizing plate;
    wherein a direction of polarization of said polarizing plate is oriented to be at an angle of approximately 90° with respect to a light ray separation direction of a first birefringent plate and the polarization direction of the polarizing plate is oriented to be at an angle of approximately 45° with respect to a light ray separation direction of a second birefringent plate.

2. An imaging device comprising:
    a polarizing plate and a liquid crystal element and a plurality of birefringent plates;
    wherein a direction of polarization of said polarizing plate is oriented to be at an angle of approximately 45° with respect to a light ray separation direction of each of two birefringent plates, each of which has a light ray separation direction that is substantially perpendicular to the other.

3. The light control device according to claim 1, or the imaging device according to claim 2;
    wherein the direction of the polarization axis of said polarizing plate and that of liquid crystal orientation of said liquid crystal element forms an angle of 45 degrees with at least the light ray separation direction of a birefringent plate that is present closest to a light incidence side among members constituting said optical lowpass filter.

4. The light control device according to claim 1, or the imaging device according to claim 2;
    wherein the direction of the polarization axis of said polarizing plate and that of the liquid crystal orientation of said liquid crystal element are perpendicular to each other.

5. The light control device according to claim 1, or the imaging device according to claim 2;
    wherein said liquid crystal element is a guest-host liquid crystal element that employs negative liquid crystal molecules as a host material, and that also employs dichroic dye molecules as a guest material.

6. The light control device according to claim 1, or the imaging device according to claim 2;
    wherein said imaging device is a CCD (Charge Coupled Device) camera.

7. The device according to claim 6;
    wherein said light control device, said optical lowpass filter, and said CCD (charge coupled device) element are disposed in a casing.

8. The light control device according to claim 1, wherein the direction of polarization of said polarizing plate is oriented to be at an angle of approximately 45° with respect to a light ray separation direction of a third birefringent plate.

9. The light control device according to claim 1, wherein a direction of liquid crystal orientation and the direction of polarization of the polarization plate are substantially perpendicular.

10. The imaging device according to claim 2, wherein a direction of liquid crystal orientation and the direction of polarization of the polarization plate are substantially perpendicular.

11. The light control device according to claim 8, wherein a direction of liquid crystal orientation and the direction of polarization of the polarization plate are substantially perpendicular.

12. The light control device according to claim 1, wherein the polarization plate is selectively moved into and out from an optical path.

13. The light control device according to claim 1, wherein the liquid crystal element is comprised of negative liquid crystal molecules as a host material.

14. The light control device according to claim 8, wherein the liquid crystal element is comprised of negative liquid crystal molecules as a host material.

* * * * *